(12) United States Patent
Lavastre et al.

(10) Patent No.: US 7,799,724 B2
(45) Date of Patent: Sep. 21, 2010

(54) HOLLOW BEADS OF POLYETHYLENE

(75) Inventors: Olivier Lavastre, Gahard (FR); Laurent Gallard, Villiers sur Chizé (FR)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 999 days.

(21) Appl. No.: 10/553,041

(22) PCT Filed: Apr. 7, 2004

(86) PCT No.: PCT/EP2004/050484

§ 371 (c)(1), (2), (4) Date: Oct. 27, 2006

(87) PCT Pub. No.: WO2004/089542

PCT Pub. Date: Oct. 21, 2004

(65) Prior Publication Data

US 2007/0112153 A1    May 17, 2007

(30) Foreign Application Priority Data

Apr. 14, 2003 (FR) .................................. 03 04618

(51) Int. Cl.
*C08F 4/44* (2006.01)
(52) U.S. Cl. ........................ 502/165; 526/161; 526/352
(58) Field of Classification Search .................. 526/161
See application file for complete search history.

(56) References Cited

U.S. PATENT DOCUMENTS 5,093,297 A * 3/1992 Woo et al. ................... 502/155
5,955,555 A   9/1999 Bennett
6,489,497 B1  12/2002 Brookhart

FOREIGN PATENT DOCUMENTS

FR          2066394          8/1971

OTHER PUBLICATIONS

Taylor, et al. Science, 1998, vol. 280, 267.*

* cited by examiner

*Primary Examiner*—Melvin C Mayes
*Assistant Examiner*—Yun Qian
(74) *Attorney, Agent, or Firm*—Tenley R. Krueger

(57) ABSTRACT

The present invention discloses a method for preparing hollow beads of polyethylene of controlled morphology and size.

12 Claims, 2 Drawing Sheets

HOLLOW BEADS OF POLYETHYLENE

This invention is related to the field of hollow beads of polyethylene and their method of preparation. It also relates to the catalyst components used in their preparation.

Iron-based catalyst systems have been described in literature for the polymerization or oligomerisation of olefins.

For example by Britovsek et al. (G. J. P. Britovsek, V. C. Gibson, B. S. Kimberlay, P. J. Maddox, S. J. McTavish, G. A. Solan, A. J. P. White and D. J. Williams, in Chem. Comm., 1998, 849.) describe novel olefin polymerization catalysts based on iron and cobalt that are active for the polymerization of olefins, particularly ethylene.

Small, Brookhart and Bennett (B. L. Small, M. Brookhart and A. M. A. Bennett, in J. Am. Chem. Soc., 1998, 4049.) describe an iron and cobalt catalysts that are very active for the polymerisation of ethylene.

Small and Brookhart (B. L. Small and M. Brookhart, in Macromolecules, 1999, 2120.) disclose a new generation of iron catalysts for the polymerization of propylene.

Some other research groups such as for example Roscoe et al. (S. B. Roscoe, J. M. Fréchet, J. F. Walzer and A. J. Dias, in Science, 1998, vol. 280, 270.) have been able to produce polyolefin spheres from metallocenes supported on non-interacting polystyrene support.

Liu and Jin (C. Liu and G. Jin, in New J. Chem. 2002, 1485.) disclose a method for immobilizing an iron-based catalyst on polystyrene chains.

None of these prior art documents have addressed the problem of preparing hollow beads of polyethylene of controlled morphology and size.

The present invention discloses a method for preparing hollow beads of polyethylene of controlled morphology and size.

The present invention also discloses a supported iron-based catalyst component very active in the preparation hollow beads of polyethylene.

The present invention further discloses a method for preparing the supported iron-based catalyst component.

Accordingly, the present invention discloses a method for preparing hollow beads of polyethylene of controlled morphology and size that comprises the steps of:
a) providing a supported catalyst component wherein the support is a porous functionalised bead of polystyrene and wherein the catalyst component is impregnated on the support and is an iron based complex of general formula I.

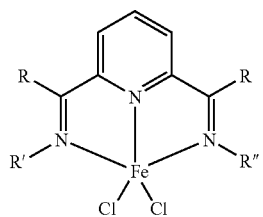

wherein R is the same and is an alkyl having from 1 to 20 carbon atoms and wherein R' and R" are the same or different and are a substituted or unsubstituted alkyl having from 1 to 20 carbon atoms, or a unsubstituted or substituted aryl having substituents from 1 to 20 carbon atoms;
b) activating the support with a suitable activating agent;
c) feeding the ethylene monomer;
d) maintaining under polymerization conditions;
e) retrieving hollow beads of polyethylene of controlled morphology and size.

R are the same and are preferably an alkyl having from 1 to 4 carbon atoms, more preferably, it is methyl.

R' and R" are the same or different and are selected from a substituted or unsubstituted alkyl having from 1 to 6 carbon atoms or are a unsubstituted or substituted aryl having substituents from 1 to 6 carbon atoms. Preferably, R' and R" are the same and are phenyls. The substitutents on the phenyls, if present, can have either an inductive attracting, donating effect or a steric effect.

The substituents that have an inductive attracting or donating effect can be selected from hydrogen or an alkoxy, or $NO_2$, or $CN$, or $CO_2R$ or an alkyl having from 1 to 20 carbon atoms, or a halogen or $CX_3$ wherein X is a halogen, preferably fluor, or a fused ring between positions 3 and 4, or between positions 4 and 5 or between positions 5 and 6.

The steric environment of the iron-based complex is determined by the substituents at positions 2 and 6 and optionally at positions 3, 4 and 5 on the phenyls.

For the steric effect, the preferred substituents on the phenyls, if present, can be selected from tert-butyl, isopropyl or methyl. The most preferred substituents are isopropyl in positions 2 and 6 or methyl in positions 2, 4 and 6.

The present invention discloses a supported catalyst component, very active in the preparation of hollow beads of polyethylene of controlled morphology and size, that comprises a support prepared from a porous bead of functionalised polystyrene and an iron-based complex that is impregnated on the support.

The present invention also discloses a method for preparing the supported catalyst component that comprises the steps of:
a) providing a porous functionalised bead of polystyrene of formula II;

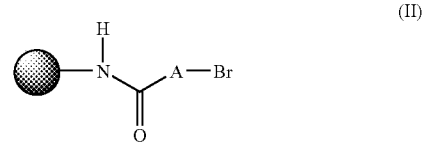

b) dissolving the iron-based complex of formula I in dichloromethane;

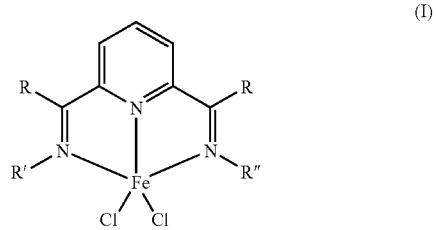

c) saturating the bead of step a) with the solution of step b);
d) evaporating the solvent;
e) retrieving dry beads of the supported catalyst component.

All reactions are carried out in inert atmosphere at room temperature of about 20° C. and under atmospheric pressure.

The starting porous functionalised beads of polystyrene have a size of from 250 to 500 microns and they are prepared from cross linked polystyrene wherein the degree of cross linking is ranging from 0.5 to 5%. A proper level of cross linking must be selected: it must be sufficiently high to insure shape constraint but sufficiently low to allow absorption of the active ingredients. A degree of cross linking of from 1 to 2% is preferred.

A catalyst system is then prepared by activating the supported catalyst component with a suitable activating agent.

The activating agent can be selected from aluminoxanes or aluminium alkyls.

The aluminium alkyls are of the formula $AlR_x$ and can be used wherein each R is the same or different and is selected from halides or from alkoxy or alkyl groups having from 1 to 12 carbon atoms and x is from 1 to 3. Especially suitable aluminiumalkyl are dialkylaluminum chloride, the most preferred being diethylaluminum chloride (Et2AlCl).

Aluminoxane is used to activate the catalyst component during the polymerisation procedure, and any aluminoxane known in the art is suitable.

The preferred aluminoxanes comprise oligomeric linear and/or cyclic alkyl aluminoxanes represented by the formula:

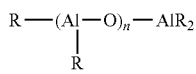

for oliomeric, linear aluminoxanes and

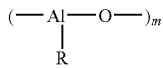

for oligomeric, cyclic aluminoxanes, wherein n is 1-40, preferably 10-20, m is 3-40, preferably 3-20 and R is a $C_1$-$C_8$ alkyl group and preferably methyl.

Methylaluminoxane (MAO) is preferably used.

The hollow beads of polyethylene have a diameter of from 0.5 to 2 mm as can be seen on FIG. 1 representing the starting beads of polystyrene and the final beads of polyethylene. The beads have a very narrow size distribution.

The catalytic activity is governed by the nature of the substituents R' and R" on the phenyl groups.

LIST OF FIGURES

FIG. 2 represents a hollow bead of polyethylene.

EXAMPLES

Figure 1:
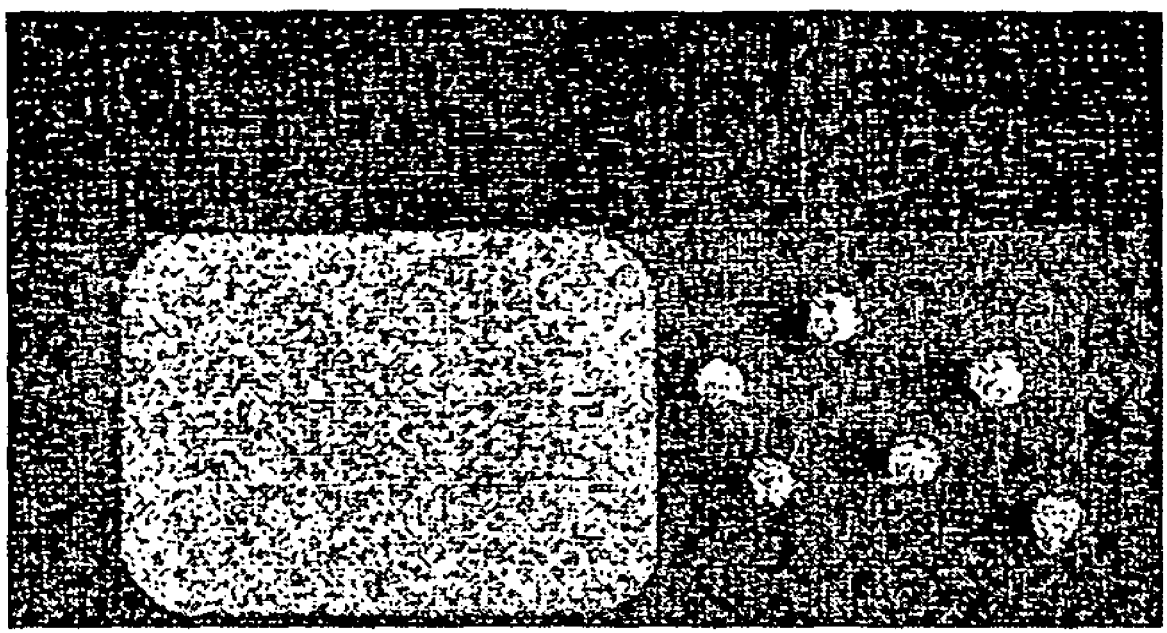
FIG. 1 represents the starting polystyrene beads and the final polyethylene hollow beads.
Figure 2A:
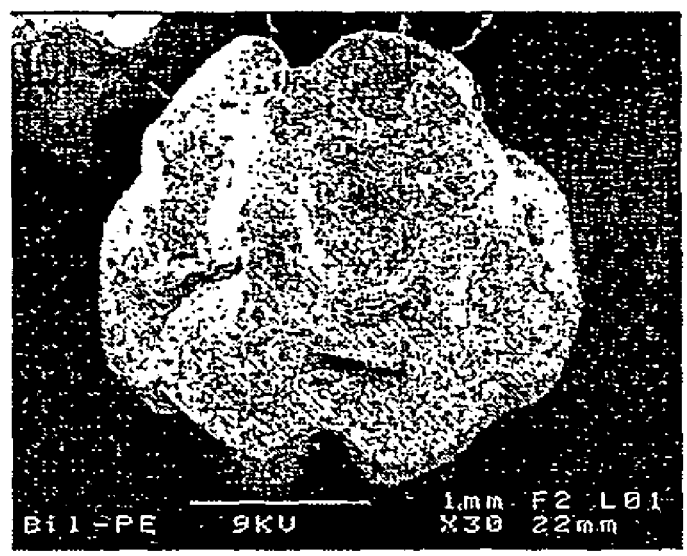
FIG. 2a is an external view and FIG. 2b is an internal view of the bead.
Figure 2B:
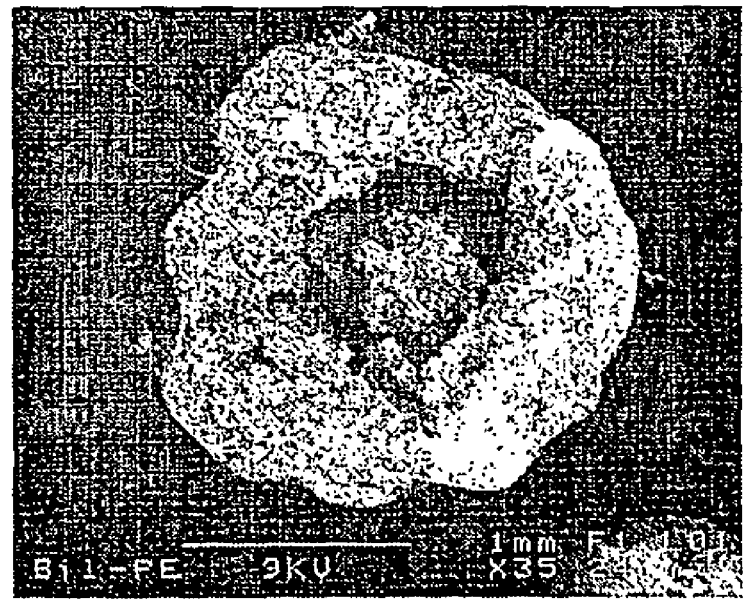

The starting materials and reagents, purchased from commercial suppliers, were used after standard purifications. The solvents were dried and distilled before use as follows:
over sodium and benzophenone for toluene and tetrahydrofuran (THF),
over sodium for methanol and
over phosphorus pentoxide for dichloromethane (DCM).

Manipulations were all performed on a vacuum line under argon, using standard Schlenk tube techniques or in Jacomex glove box.

The rotating shaker is a Labquake shaker.

NMR spectra were recorded on a Bruker DPX 200 at 200 MHz (for $^1H$) and 50 MHz (for $^{13}C$).

Infrared ATR (siliclum) spectra were recorded in the range 4000-400 cm$^{-1}$ on a IR Centaurµs microscope.

High resolution mass spectra were obtained on a Varian MAT 311 (electronic ionisation mode) at CRMPO, University of Rennes.

Elemental analysis were performed by the CNRS laboratory, Vernaison (France).

Synthesis of the Catalyst

The synthesis of bisimines from 2,6-diacethylpyridine was performed as described for example in Brtovsek et al. (G. J. P. Britovsek, M. Bruce, V. C. Gibson, B. S. Kimberley, P. J. Maddox, S. Mastroianni, S. J. McTavish, C. Redshaw, G. A. Solan, S. Strömberg, A. J. P. White, D. J. Williams, in J. Am. Chem. Soc., 1999, 8728.). To form the iron complex, the procedure described in Small and Brookhart (L. Small and M. Brookhart, in Macromolecules, 1999, 2120.) was applied, i.e. iron (II) chloride was added to the bisimines in THF. The reaction was allowed to stir at reflux for 30 minutes. The reaction mixture was cooled at room temperature. The precipitate of iron complex appeared and the mixture was filtrated. The precipitate was dried under vacuum.

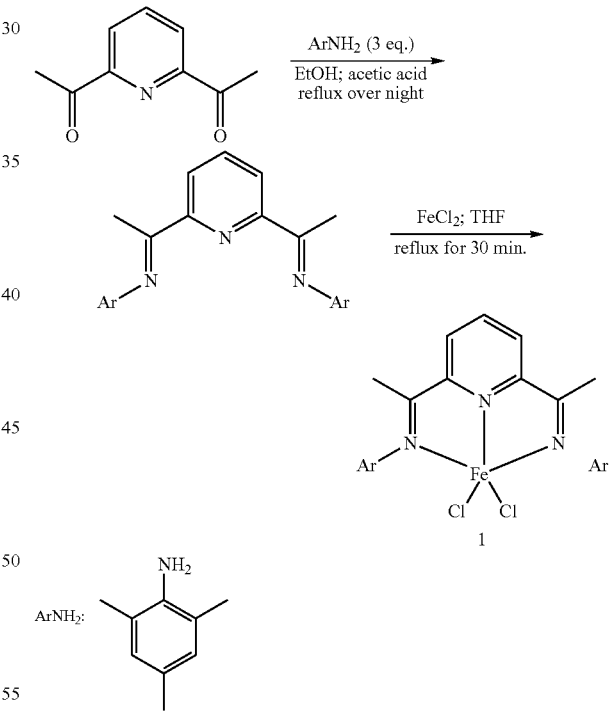

To a refluxed homogenous solution of 163 mg (1 mmol) of 2,6-diacetylpyridine in 3 mL of absolute ethanol under argon atmosphere were added 406 mg (3 mmol) of 2,4,6-trimethylaniline. After the addition of a few drops of glacial acetic acid, the solution was refluxed for 20 hours at 90° C.

Upon cooling to mom temperature, the product crystallized from ethanol. After filtration the yellow solid was washed with cold ethanol and dried under reduced pressure to give 0.164 g (42%) of the bisimine.

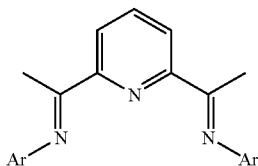

45.77 mg (0.23 mmol) of iron (II) chloride tetrahydrate were dried under reduced pressure at 120° C. during 5 hours. The iron (II) chloride was added to the bisimines in THF. The reaction was allowed to stir at reflux for 30 minutes. The reaction mixture was cooled at room temperature. The precipitate of iron complex appeared and the mixture was filtrated and dried under reduced pressure to give 0.104 g (87%) of the blue complex 1.

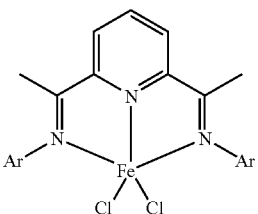

1

Under argon, to 177 mg (0.2 mmol) of polystyrene AM-NH$_2$ beads purchased from Rapp polymere (1,13 mmol/g, 250-315 μm) in 3.6 mL of dichloromethane (DCM) were slowly added 0.44 mL (0.3 mmol) of triethylamine followed by a careful addition of 0.36 mL (2.4 mmol) of 6-bromohexanoyl chloride. The reaction mixture was stirred for 2 h at room temperature on a rotating shaker before being drained. The beads were then washed twice for 30 minutes with dimethylformamide, twice for 10 minutes with DCM, twice for 10 minutes with methanol, twice for 30 minutes with dimethylformamide, twice for 10 minutes with DCM, twice for 30 minutes with methanol and then dried under reduced pressure to give 0.2 mmol of the white beads 2. A Kaiser test was performed to verify sure the reaction was complete.

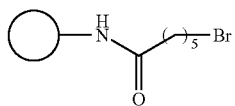

2

Impregation of Porous Beads

The following reaction was entirely performed in a glove box. A $8.9 \times 10^{-3}$ M solution of iron complex (1) in DCM was prepared by dissolving 0.233 mg (0.0448 mmol) of complex (1) in 5 mL of DCM. This solution was added to the beads (2). The mixture was stirred at room temperature for 2 hours on a rotating shaker. They were then drained, washed quickly with 2 mL of DCM and then dried under reduced pressure. The same solution of iron complex (1) was prepared again and added to the beads a second time. The mixture was stirred at room temperature for 2 hours on a rotato. They were drained, washed quickly with 2 mL of DCM and then dried under reduced pressure to give the blue beads (3). The amount of iron was measured as:

Fe$_{(ICP\ AES)}$: 630 ppm (wt).

Total loading of beads (3): $1.128 \times 10^{-2}$ mmol Fe/g of beads.

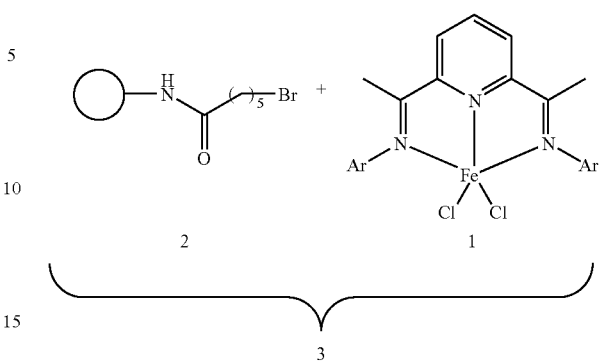

Polymerisation of Ethylene

Under argon, 55 mL of toluene (55 ml), followed by 3.2 mL of MAO (30% wt in toluene) were added in a 200 mL stainless steel reactor. The reactor was flushed with argon for 5 minutes. 8.4 mg of the dried beads (3) ($9.47 \times 10^{-8}$ mol Fe) were quickly injected, with the help of 2 mL of toluene added 2 minutes before, in the reactor. The reactor was again flushed with argon for 5 minutes. The temperature was raised to 50° C., the reactor was put under 20 bar of ethylene and the reaction mixture was stirred for 3 hours. When the reaction mixture was back to room temperature and under argon, the solution was taken off, the beads were washed with ethanol and dried under reduced pressure to give 0.727 g porous spheric polyethylene particles. The activity was measured as 7.67 Tons of polyethylene produced per mole of iron.

The invention claimed is:

1. A method for preparing a supported catalyst component for the production of hollow beads of polyethylene comprising:
   (a) providing porous functionalized beads of polystyrene characterized by the formula:

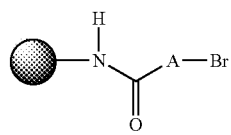

wherein: A is a substituted or unsubstituted alkyl group having from 2 to 18 carbon atoms providing a flexible arm;
   (b) dissolving an iron-based complex characterized by formula I in a solvent:

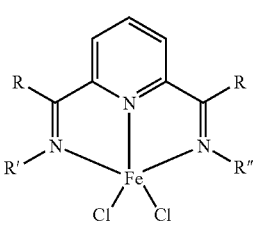

(I)

wherein: R is an alkyl group having from 1 to 20 carbon atoms; R' and R" are the same or different and are each a substituted or unsubstituted alkyl group having from 1 to 20 carbon atoms, an unsubstituted aryl group or a substituted aryl group having substituents having from 1 to 20 carbon atoms;

(c) saturating the bead of subparagraph (a) with the solution of subparagraph (b);

(d) thereafter evaporating the solvent; and (e) retrieving dry beads of the supported catalyst component.

2. The method of claim 1 wherein R is an alkyl group having from 1 to 4 carbon atoms.

3. The method of claim 2 wherein R is a methyl group.

4. The method of claim 1 wherein R' and R" are the same and are substituted or unsubstituted phenyl groups.

5. The method of claim 4 wherein R' and R" are substituted phenyl groups in which the substituents are isopropyl groups in positions 2 and 6.

6. The method of claim 4 wherein R' and R" are substituted phenyl groups in which the substituents are methyl groups in positions 2, 4 and 6.

7. The method of claim 4 wherein R' and R" are unsubstituted phenyl groups.

8. A supported catalyst component produced by the process of:

(a) providing porous functionalized beads of polystyrene characterized by the formula:

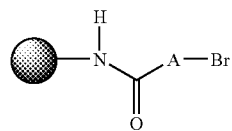

wherein: A is a substituted or unsubstituted alkyl group having from 2 to 18 carbon atoms providing a flexible arm;

(b) dissolving an iron-based complex characterized by formula 1 in a solvent:

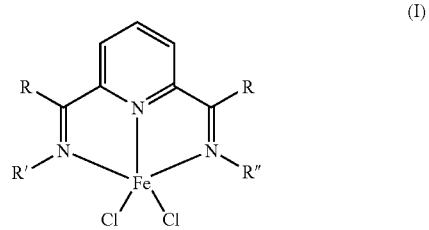

(I)

wherein: R is an alkyl group having from 1 to 20 carbon atoms; R' and R" are the same or different and are each a substituted or unsubstituted alkyl group having from 1 to 20 carbon atoms, an unsubstituted aryl group or a substituted aryl group having substituents having from 1 to 20 carbon atoms;

(c) saturating the bead of subparagraph (a) with the solution of subparagraph (b);

(d) thereafter evaporating the solvent; and (e) retrieving dry beads of the supported catalyst component.

9. A supported catalyst system comprising the supported catalyst component of claim 8 and an activating agent.

10. The supported catalyst system of claim 9 wherein said activating agent is an alumoxane.

11. The supported catalyst system of claim 9 wherein said activating agent is an aluminum alkyl.

12. The supported catalyst system of claim 11 wherein said aluminum alkyl is diethyl aluminum chloride.

* * * * *